United States Patent [19]

Tattari

[11] Patent Number: 6,145,095
[45] Date of Patent: Nov. 7, 2000

[54] FAULT DATA COLLECTION AS PART OF COMPUTER UNIT RESTART

[75] Inventor: Lauri Tattari, Vantaa, Finland

[73] Assignee: Nokia Telecommunications Oy, Espoo, Finland

[21] Appl. No.: 09/051,943

[22] PCT Filed: Oct. 29, 1996

[86] PCT No.: PCT/FI96/00573

§ 371 Date: Apr. 23, 1998

§ 102(e) Date: Apr. 23, 1998

[87] PCT Pub. No.: WO97/16787

PCT Pub. Date: May 9, 1997

[30] Foreign Application Priority Data

Oct. 30, 1995 [FI] Finland .................................. 955186

[51] Int. Cl.[7] .................................................. G06F 11/00
[52] U.S. Cl. ............................................. 714/16; 714/15
[58] Field of Search .................................. 714/16, 9, 45, 714/25, 43, 15; 711/161, 141

[56] References Cited

U.S. PATENT DOCUMENTS

| | | |
|---|---|---|
| 4,381,540 | 4/1983 | Lewis et al. . |
| 4,593,391 | 6/1986 | Mizushima et al. . |
| 4,930,128 | 5/1990 | Suzuki et al. . |
| 5,056,091 | 10/1991 | Hunt ........................................ 714/10 |
| 5,410,545 | 4/1995 | Porter et al. ............................ 714/723 |
| 5,438,675 | 8/1995 | Fujioka ...................................... 714/9 |

FOREIGN PATENT DOCUMENTS 0 590 866  4/1994  European Pat. Off. .

*Primary Examiner*—Ly V. Hua
*Attorney, Agent, or Firm*—Altera Law Group, LLC

[57] ABSTRACT

In problem situations of a computer controlling a process, such as transmission of calls, it is very important to direct the maintenance operations in the correct manner at the correct places as rapidly as possible. In the fault data collection method according to the invention, fault data is collected selectively by using empirical data about what type of information is useful in solving problems. Data (P10A–40A) about each process family is searched for from the list of process families PL in the data area (DA) of the computer's operating system. By means of the first process (P10) of the process family, data is obtained about the other processes (P11–P14) of the family. The data structures (PA) of the processes (P10–P14) provide data about the memory resources reserved by the process, time supervision, etc. By comparing the content of the data structures (PA) to the empirical base values, data structures (PA) are copied to the storage area (SA) from the process that are to be examined in greater detail. The data structures are collected after the restart has been activated but before new data has been written into the part of the main memory where these data structures (PA) are stored.

13 Claims, 4 Drawing Sheets

FAULT DATA COLLECTION AS PART OF COMPUTER UNIT RESTART

This application is a national application under 35 U.S.C. 371 of PCT/FI96/00573, filed Oct. 29, 1996, which claims priority to Finish application No. 955,86 filed Oct. 30, 1995.

FIELD OF THE INVENTION

The invention relates to fault data collection in computer systems. More precisely, the invention relates to a method for solving problems leading to a restart of a computer controlling a process, such as transmission of calls.

DESCRIPTION OF RELATED ART

Users of computers and their software are often faced with such annoying fault situations where a computer switches over to the initial state, i.e. it acts as if the power had just been switched on. In such a case, the data that was stored in the memory of the computer is usually lost. The operating system may give a short error message, such as "General Protection Fault". Such an error message gives the user or the support advisor hardly any information about the cause of the fault or advice on how to proceed so that the situation would not reoccur. The other extreme is represented by the manner in which software of a certain local area network (Novell® Netware) reports a fault situation. When an error occurs in the execution of the network server software, the support advisor is given the possibility to store the entire memory of the server on disks, dozens of which may be needed. It is clearly not easy to find the reason for the error if there is too much data. Also, the problem of known methods is that in these methods the reporting to the user takes place before the computer restart. If the error situation has confused the disk processing routines of the operating system, the situation preceding the error cannot be stored on a disk.

Computer restarts occur occasionally. For the sake of clarity, in the present application a "restart" refers specifically to a restart the causes of which are to be examined.

It is very important that in error situations maintenance operations can be directed in the correct manner at the correct places. For example PC Format, August 1995, p. 27, discloses in connection with computer software faults that on Jan. 15, 1990 as much as half of the AT&T's telephone network in the United States was out of use at times and that on that day 70 million calls were left uncompleted. The fault was traced to a maintenance operation that was directed to the software controlling AT&T exchanges and that did not work out as planned.

SUMMARY OF THE INVENTION

FIG. 1 shows a distributed computer system. At least some of the computers 10 and 20 (in this example computer 10) act as a server to the other computers 20. The server 10 comprises a disk drive 11 wherein the system software is stored. The computers are interconnected via a link 1 that may be a cable of a local area network or a remote connection, such as a reserved modem line, an ISDN connection, a radio link, or the like. For example the computer 20 is started in a manner known per se in such a way that support circuits 25 of the computer produce a start signal that makes the central processing unit 24 jump to a predetermined address comprising a read-only memory 22 that contains the initial load program. The execution of the initial load program by the central processing unit 24 guides for example a network interface 21 to load from the server 10 via the link 1 first the operating system that may comprise more advanced load programs. For execution, the operating system and the other programs are loaded into a RAM or random access memory 23, called hereinafter a main memory. After the loading of the operation system, the application programs are loaded and the execution of these programs makes the computer 20 carry out its actual task. As an alternative to the loading of the software via the link 1, the software could also be loaded via a disk drive controller 26 from a local disk drive 27 if the computer 20 contains one. The computer 20 may also comprise an output device 28.

FIG. 2 shows the parts that are essential to the invention in the operating system of the computer 20. In this exemplary case, the operating system OS comprises four basic functions OS2 to OS5, i.e. process control, memory management, transmission of messages, and exclusion of processes.

FIG. 3 shows an illustrative process chain. More precisely, the chain is a chain of process control blocks (PCB). The chain may be, for example, a chain of executable processes, a chain of processes waiting for a certain event in the semaphore, or the like. The processes Pn usually have a complicated and dynamic data structure. In FIG. 3, the matters have been simplified for the sake of illustration in such a way that the data structures related to each process Pn are compressed into a parameter area PA which contains for example data about the state of the process and the memory area reserved for the process, and data about the next and the preceding process of the family. When the process ends, it should release all the memory it has reserved. A common cause for problems with memory is that a process does not release all the memory it has reserved. When the process reserves memory for a sufficient number of times without releasing the memory it has reserved previously, it finally fills all the available memory so that the other processes can no longer reserve memory. Another fault mechanism may be that a process erroneously remains in a loop and does not receive messages transmitted to it.

A formal description of semaphores and operations is disclosed in "Co-operating Sequential Processes" by E. W. Dijkstra in *Programming Languages,* ed. Genuys, F., London Academic Press, 1965.

The above-described description of processes is simplified to a large extent, but it sufficiently illustrates the problem and the solution to it. If a program loaded into the computer 20, more precisely a process of the software, becomes faulty or for example a memory error occurs in the computer, the computer is restarted. In such a case, the above-described software loading procedure is repeated. The problem in locating the causes of the error that lead to the restart is firstly that it is difficult to separate relevant data from irrelevant data. Another problem is that the malfunction of the software may have confused the software controlling the network interface 21 and/or the disk drive controller 26, so that it might be impossible to store data anywhere before new data is written on it during the restart.

It is previously known to collect data from a data area of a computer during a restart. For example U.S. Pat. 4,930,128 describes a technique where a page data set is stored on the hard disk as part of the initial program load. Such nonselective data storage provides the person trying to locate the error with too much irrelevant data. As described above, such a great amount of unscreened data is in practice of no use in locating errors.

On the basis of the above introduction, the object of the invention is to provide a method for collecting fault data of computer systems, in which method such data that can be relevant in finding the cause of the error is stored for example for subsequent analysis, but irrelevant data is not stored. Another object is to provide equipment realizing the method.

The invention is based on the fact that an operating system of a computer is supplemented with a function which collects, during a restart, such data that can be important in finding the cause of the fault. According to the invention, the memory areas of the computer are only initialized when the parts of the memory areas that are essential for locating the fault have been stored. More precisely, the objects of the invention are achieved with methods and equipments that are characterized by what is disclosed in the independent claims. Different manners of defining fault data collection more closely are disclosed in dependent claims.

The method and equipment according to the invention provide first the advantage that the data related to a restart can be screened in advance with a computer so that irrelevant data does not unnecessarily load human and computer resources. The minor use of resources provides the further advantage that data can also be collected even with equipment that is partly broken. Another advantage is that the data is stored when the computer is in a well-defined state, so that peripheral devices and their drivers that might be needed for storing the data are available.

BRIEF DESCRIPTION OF THE DRAWINGS

The invention will be described below in greater detail in connection with the preferred embodiments and with reference to the accompanying drawings, in which.

DETAILED DESCRIPTION OF THE INVENTION

Figure 1:
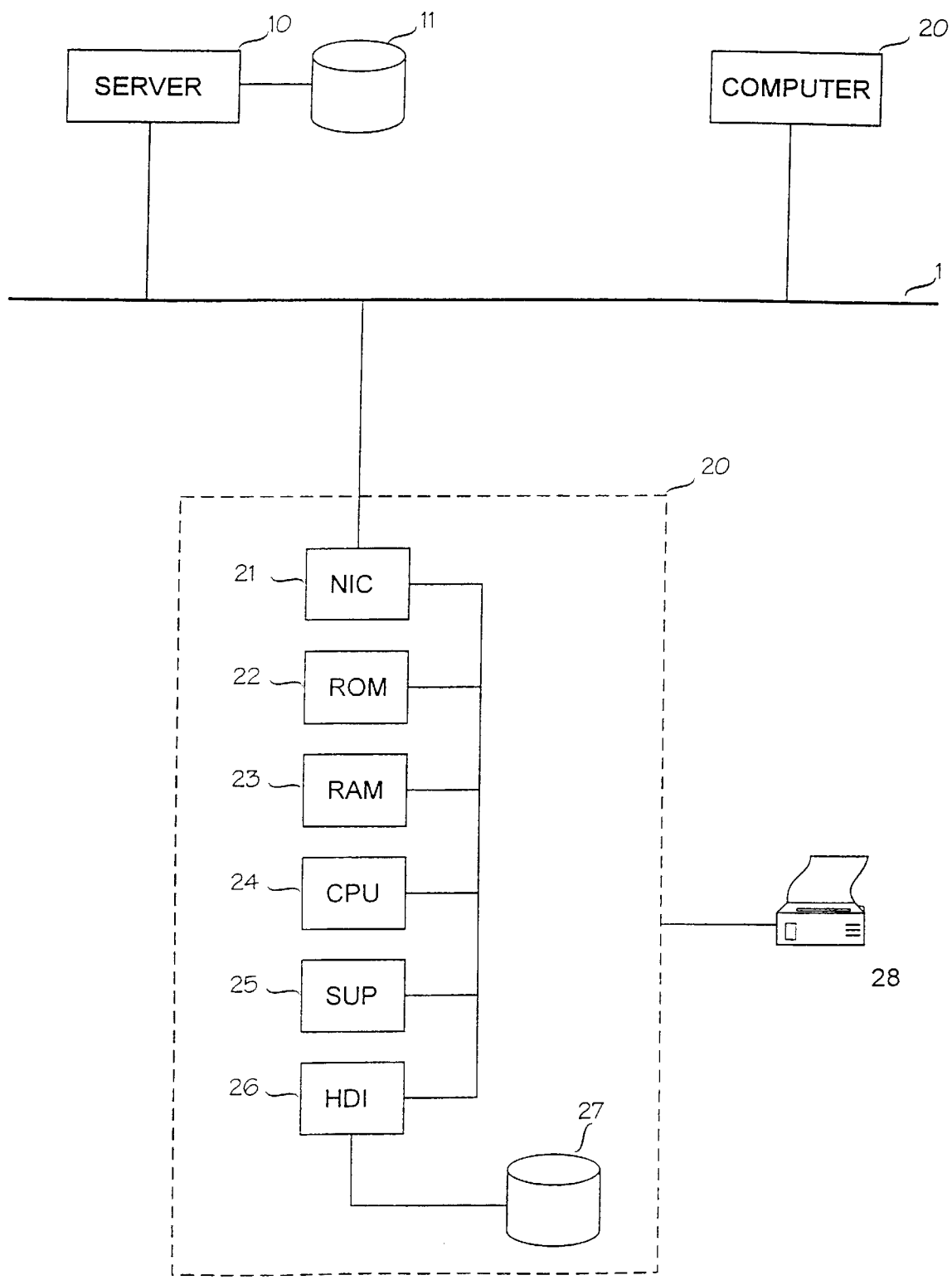
FIG. 1 shows a distributed computer system.
Figure 2:
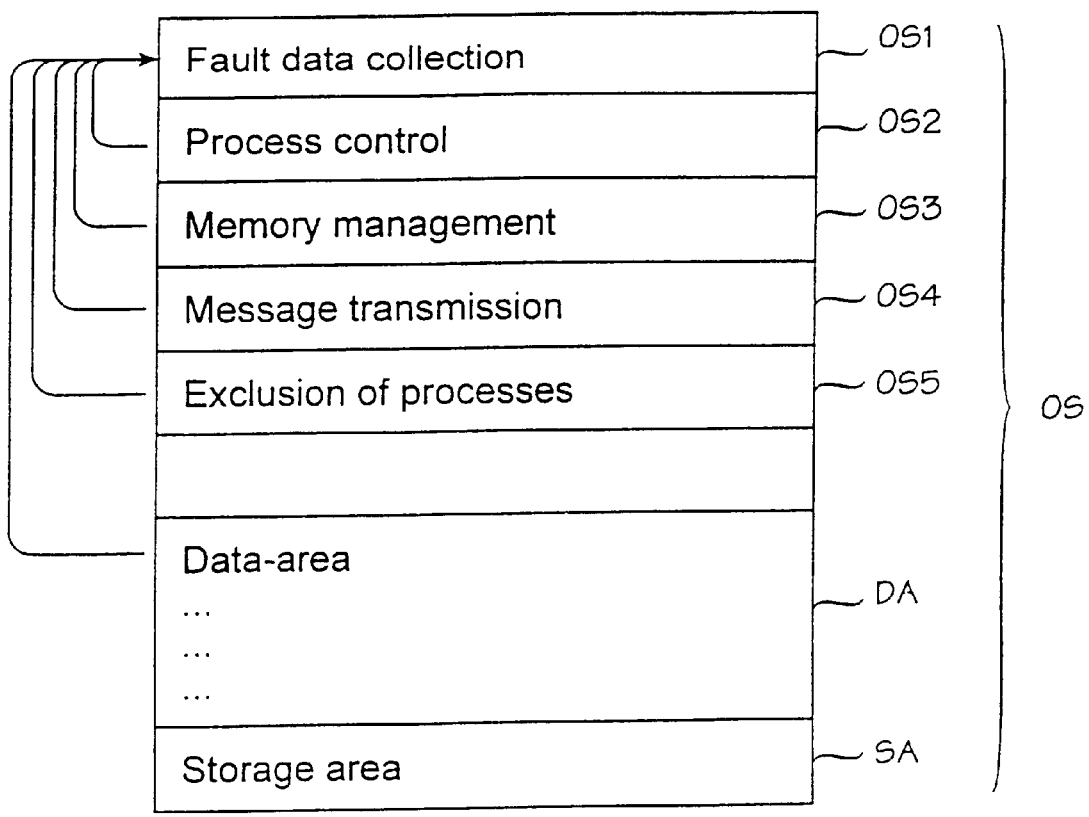
FIG. 2 shows parts of the operating system of the computer.

FIG. 2 shows the parts of the operating system of the computer 20. The fault data collection function OS1 according to the invention can be placed in the operating system, as well as the other functions of the operating system. The fault data collection function OS1 is shown as the first function of the operating system in FIG. 2. This placement is intended to emphasize that the fault data should be collected before the software is loaded for example from the disk drive and the data structures are initialized again. FIG. 2 also shows that a part of the main memory 23 of the computer 20 is reserved as storage area SA the use of which will be explained in connection with FIG. 3.

Figure 3:
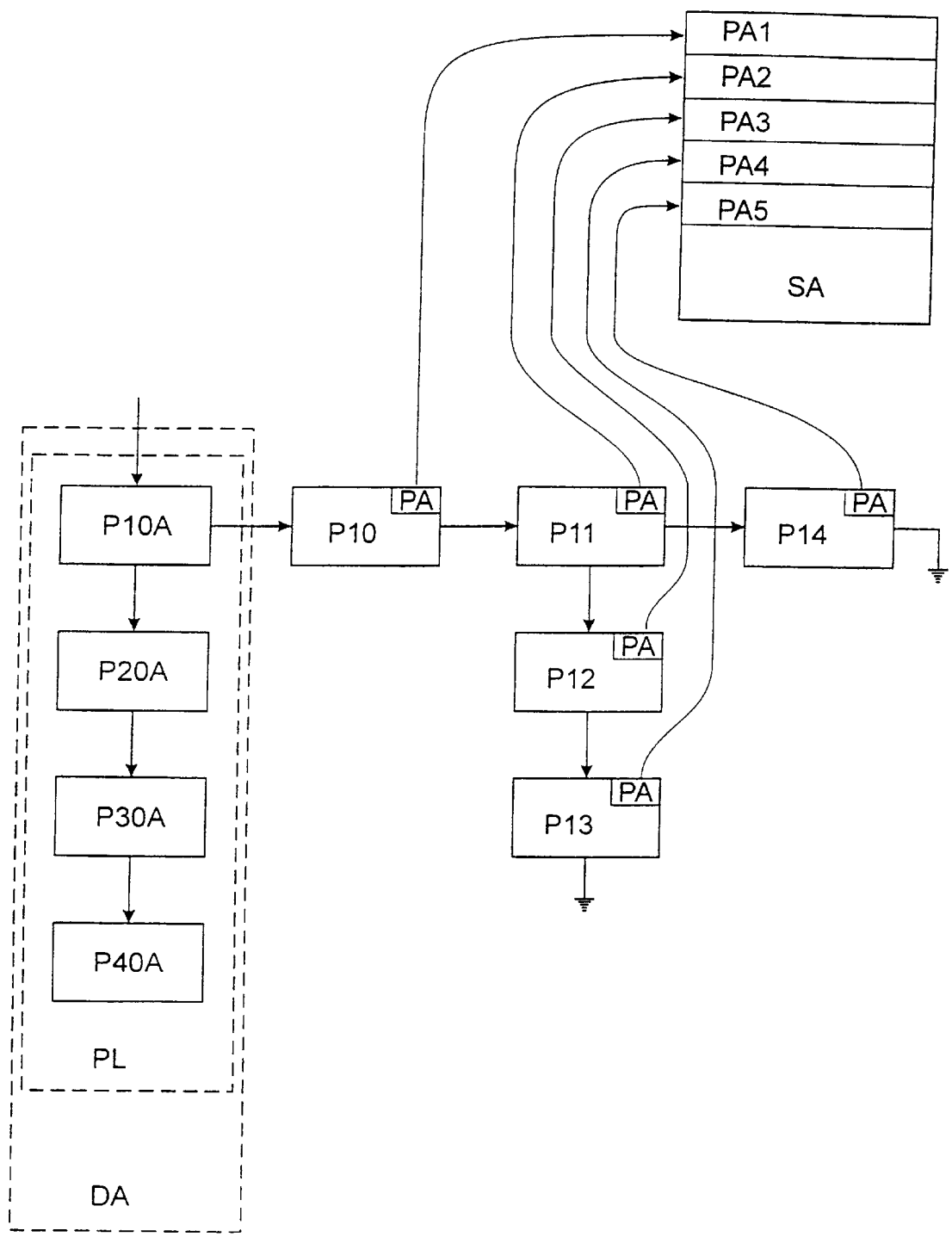
FIG. 3 shows an illustrative chain of processes.

FIG. 3 shows an illustrative chain of processes. The fault data collection program OS1 according to the invention receives information about the origin of the chain for example by means of software packaging techniques. The same technique is utilized for example to enable the use of general purpose libraries. The general idea is that the fault data collection program OS1 according to the invention finds out the parameters of different processes and process families in the same manner as the rest of the software OS2 to OS5 finds out the corresponding parameters. The starting point P10A of process P10 is located on the basis of the start point. Process P10 is related to process P11 which is in turn related to processes P12 and P13. FIG. 3 also shows, by way of example, a case where process P11 may also be related to process P14. Assume first that the processes can be loaded into the memory dynamically, i.e. into arbitrary addresses, so that the data about the memory address wherein a process is located is for example in the parameter area of the previous member of the family.

It is described below how the fault data collection program according to the invention can find out which process remains in a loop. Such a deadlock can be detected for example in such a way that the message that was transmitted last to the process is stored until the process is ready to receive the next message. If the program remains in a loop, the message is usually not released either. The fault data collection program OS1 according to the invention may detect such a situation for example by examining the process control block PCB in the parameter area PA.

Also, after some processes the available memory is so fragmented that extensive processes cannot be provided with a uniform memory area. Such problems can be solved from the data structures of the memory management of the operating system.

The inquiry into the above-described illustrative problems is facilitated when the data about the memory areas reserved by the processes is stored during the restart in the following manner:

(i) the address P10A of the first member P10 of the first process family is read from the list of process families PL;

(ii) the parameter area PA of the first process of the process family is read on the basis of this address and copied into the storage area SA;

(iii) step (ii) is repeated recursively for all the processes this process has called;

(iv) the address of the first member of the next process family is read from the list, and steps (ii) to (iii) are repeated until the list of process families has been processed in full.

In this connection, the parameter area PA refers to an area in the main memory 23, related to each process and storing the data that is related to the process and essential to the invention. The exact nature of this essential data will be described below. The storage area SA is an area which is also situated in the main memory 23, which is set up by the data collection software according to the invention, and to which the parameter areas PA of the processes are copied during a restart.

The above-described method is applicable in the general case where processes can be loaded into any memory area. When certain processes are always loaded into a particular address, the start and the end address of their parameter areas are obtained directly in the known manner during a program compilation. In case of an analysis program according to the invention, these addresses can be referred to in the same manner as they are referred to when setting up the rest of the software, too. In this case, it is possible to use a more simple method that can be represented in the form of the following pseudo code:

```
copy P10.PA to SA.PA1
copy P11.PA to SA.PA2
. . .
```

Pn.PA refers to a parameter area of process Pn and correspondingly SA.PAn refers to the area in the storage area SA to which the parameter area of process Pn is copied. Translated into a real programming language, this pseudo code given above would be implemented in such a way that the start address of P10.PA is loaded into the source register for the purpose of copying, the start address of SA.PA1 is loaded into the target register, and the size of P10.PA in bytes is loaded into a register indicating the number of bytes of the copying. The start address of SA.PA2 is obtained by adding the size of P10.PA in bytes to the start address of SA.PA1, etc. Correspondingly, the parameter area PA of any process Pn is copied to the storage area SA into an address that is obtained by adding the size of the parameter area PA of the preceding process Pn-1 to the start address SA.PAn-1 of the storage area of the preceding process.

It is assumed above, in order to illustrate the invention, that the parameter area PA of each process is a uniform memory area. If the parameter area has been distributed into several separate areas, the above-described steps for copying the parameter area to the storage area SA must be repeated for each segment of the distributed parameter area.

Valuable data can also be obtained by examining semaphores related to a process. A semaphore is a counter which comprises a waiting state and by means of which it is possible to carry out the mutual exclusion of the processes. Processes are used in such a way that usually only one process can handle an area protected with a semaphore. Such an area protected by a semaphore is processed with a software routine that starts with a so-called P operation and ends with a so-called V operation. The P operation decrements the value of the counter and if the value is too small (negative), the process joins itself to the queue in the semaphore. Otherwise the process continues the code following the P operation. At the end of the code the process carries out a V operation wherein the value of the counter is incremented. If the value has been negative, the standby process is activated and it has in turn access to the protected area.

The problem is that when a process fails in a protected area, i.e. when it controls a semaphore, the queue of this semaphore stops without special measures. On the other hand, the program may be faulty and it does not perform the V operation at all. These problems can be solved by indicating the data about all the semaphores controlled by the process in the parameter area.

The above-described method as such produces far too much insufficiently screened data for practical applications. In reality, the data must be screened more accurately before it is transferred for human analysis. It could be for example taken as a goal that the data relevant for clearing the fault could be compressed from the main memory of about 32 megabytes into a few or even one readable page. In such a case, the 0.01% of the data that is essential for locating the fault must be found from the main memory. A suitable technique is that the fault data collection program sets a predetermined threshold value for the memory reserved by a process. The parameter areas of only those processes that have reserved memory in an amount exceeding this threshold are stored. Alternatively, the fault data collection program can go through the chain of process families in the above-described manner, but twice. The first time only includes finding out how much memory has been reserved for each process or process family. The second time the parameter areas of a few or only one process family reserving the most memory are stored in the storage area.

It has been assumed above for the sake of generality that the list of process families PL is a linear list, i.e. a chain where one process family is followed by another but only one process family (or the end of the list). It has also been assumed that within a process family the processes Pn may form tree structures. If the actual situation is more simple than the one described above, for example in such a way that the processes form only linear lists within the process family, the processing of the tree structures can be deleted for the sake of simplicity.

The content of the parameter areas PA essential to the invention may include for example the following process-specific matters when for example Intel®x86 processors are used:

memory areas reserved by a process (size, time of reservation, use)

messages transmitted to and not yet received by the process time supervisions set by the process files opened by the process shared resources reserved by the process, e.g. P operations executed to shared semaphores application-specific variables in the stack and in the data area, and the data stored in these areas by the operating system.

Correspondingly, data shared by all the processes includes:

memory reservation data, especially data relating to available memory semaphores related to memory reservations semaphores intended for general use an error log of the operating system.

The fault data collection program OS1 according to the invention may find these data structures from the memory and obtain data from them in the same manner as the rest of the software processes the same data structures. Also, it is advantageous to supplement the fault data collection program with the possibility of controlling the operation of the program with forced control records that can be used to force the program to collect data from certain memory areas. These memory areas to be collected can be indicated either with absolute addresses or symbolic labels (if the corresponding linkage list is stored in the memory of the computer). A support advisor trying to locate the fault may form such forced control records with any simple word processing program. These records may comprise in the simplest form only two parameters, a start and an end address, and the fault data collection program copies the content of the area between these addresses to the storage area. The program may also copy an identifier, such as the start address. In practice, faults tend to occur in unexpected places. With forced control records it is possible to also collect data from places that have not been anticipated when setting up the fault data collection program.

Figure 4:
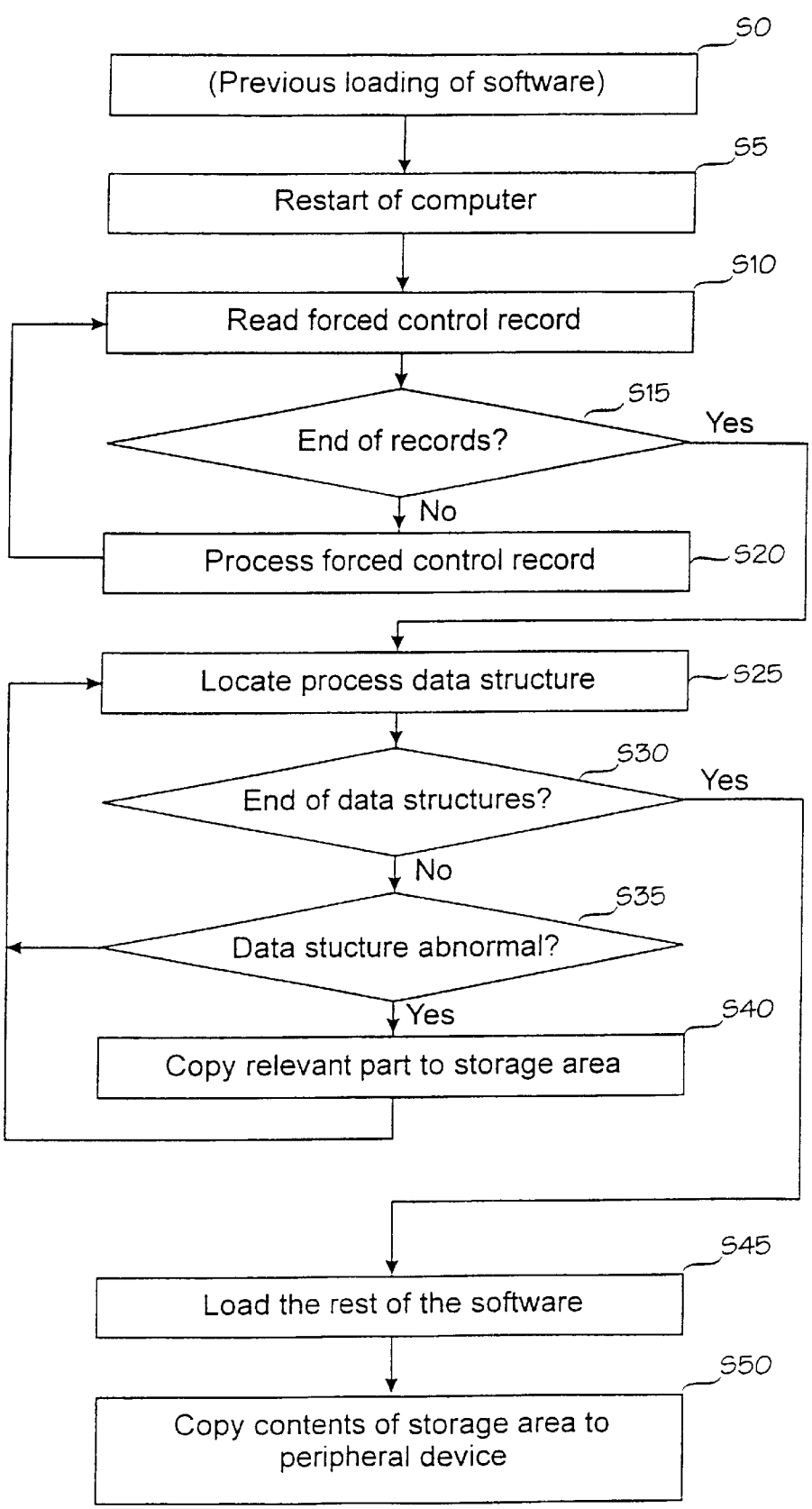
FIG. 4 is a flow chart illustrating the operation of a fault data collection program.

FIG. 4 shows possible steps of an illustrative embodiment of the fault data collection program OS1 according to the invention. The collection program is loaded into the memory with the rest of the software (step S0). In this step, the jump following the next restart is set so that it is directed to the collection program. The next restart activates the collection program (step S5). The collection program reads from the main memory 23 the first record from the list of forced control records (step S10). If such a record exists, the collection program processes it (step S20). When it is detected in step S15 that the list of forced control records is at the end, the collection program proceeds to step S25 to search for the data structures of the processes. In step S30 it is examined whether all the data structures have been processed. If they have not, it is examined in step S35 whether the data structure contains any anomalous features. If it does, in step S40 the essential part of the data structure is copied to the storage area SA. When it is detected in step S30 that the list of the data structures is at the end, the program proceeds to step S45 to load the other parts of the software among which the routines for processing peripheral devices, such as disk drives, are essential to the invention. When the routines for processing the peripheral devices have been loaded, in step S50 the content of the storage area SA is copied for the use of the support advisor. The support advisor may receive the content of the storage area SA as a report on a printer, as a disk file or by telephone to a remote work station.

In some systems a faulty program may mix up the main memory so completely that it also causes a malfunction in the fault data collection program. Such a risk can be restricted by placing the fault data collection program in a memory that is protected at least from unintended overwriting. The protection can be carried out for example by placing the fault data collection program in a ROM or FLASH memory or by preventing the writing into the memory segment where the collection program is located by using the registers of the processor.

The embodiments illustrating the invention have been described by way of example in connection with Intel®x86 processors. It is clear that the invention is not restricted thereto, but it can be applied in all types of processors, so that memory management and other data related to the processor family in question is naturally collected. The use of the terms varies somewhat in the field. The term "process" used in the present application can be called a "thread" somewhere else, so that the "process family" used in the present application would correspondingly be a "process". However, the scope of the invention is not considered to depend on the terms used. It is also evident for a person skilled in the art that as the technology develops, the basic idea of the invention can be implemented in various ways. The invention and the embodiments thereof are not restricted to the above-described examples, but they may vary within the scope of the claims.

What is claimed is:

1. A method for collecting fault data that has resulted in a restart of a computer, said computer comprising software with one or several processes, the method comprises:

reading from the main memory of the computer at least some of the data structures of the software after the restart of the computer has been initiated but before new data has been written into the part of the main memory where these data structures are stored;

comparing the content of the data structures to predetermined normal values; and in response to a deviation in the content of said data structure from the predetermined normal value, copying the data structures read from the main memory to a predetermined peripheral device in order to maintain the content of the data structures over the restart.

2. A method according to claim 1, wherein the method further comprises:

before the restart of the computer, reserving a predetermined storage area from the main memory of the computer for collecting fault data; and after the restart, copying the data structures to the predetermined storage area before they are copied to the peripheral device.

3. A method according to claim 1, wherein the error situation that resulted in the restart is classified into a predetermined class and at least some of the steps are responsive to the data structure containing data related to the class of the error situations in question.

4. A method according to claim 3, wherein the classes of error situations contain at least one of the following classes: insufficient memory, hold-up of process in loop, overflow of memory area allowed for a process, and undefined command.

5. A method according to claim 4, wherein when the error situation belongs to the class of "insufficient memory", the method comprises:

determining one or at most a few processes that have reserved the main memory the most before the restart; and copying the data structure in response to said data structure containing data that is related to at most a few processes that have reserved the main memory the most.

6. A method according to claim 4, wherein when the error situation belongs to the class of "hold-up of process in loop", the method comprises:

determining the processes which have been sent messages that the process has not released; and copying the data structure in response to said data structure containing data related to the process that has not released the message transmitted to it.

7. A method according to claim 1, wherein the method further comprises:

reading a group of forced control records containing data structures; and copying the data structures contained in the forced control records to the peripheral device.

8. A computer comprising a central processing unit, software, a main memory and peripheral devices, the software being loaded to the main memory via at least one peripheral device, wherein in order to collect fault data during a restart, the computer further comprises a fault data collection program:

for reading at least some of the software data structures from the main memory after the restart has been initiated but before new data has been written to the part of the main memory where these data structures are stored;

for comparing the data structures to predetermined normal values; and for copying data structures that deviate from the predetermined normal values to a predetermined peripheral device to maintain the content of the data structures over the restart.

9. A computer according to claim 8, wherein when the computer executes the fault data collection program it also copies the data structures to a predetermined storage area before they are copied to the peripheral device.

10. A computer according to claim 8, wherein the computer copies the data structures to the fixed disk.

11. A computer according to claim 8, wherein the computer copies the data structures via a cable to a server.

12. A computer according to claim 8, wherein the computer copies the data structures to an output device.

13. A computer according to claim 8, wherein the fault data collection program is placed in a memory that is protected from writing.

* * * * *